Nov. 10, 1931.  W. I. CLAYES  1,831,094
FILTER
Filed Sept. 19, 1928
FIG_1_
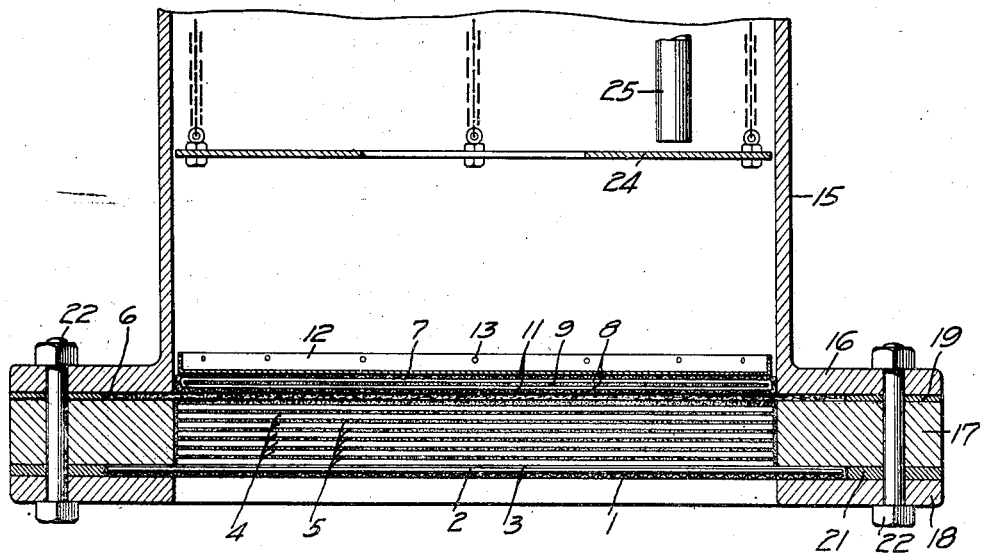
FIG_2_
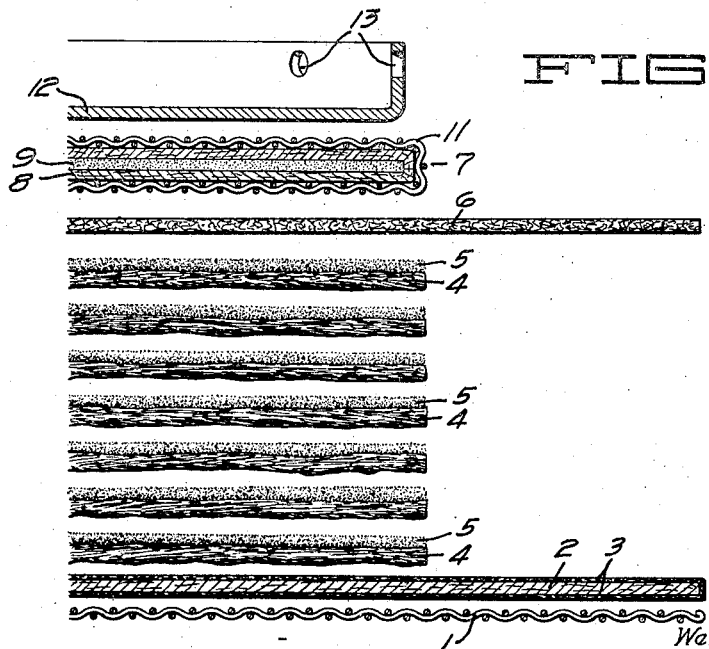
INVENTOR
Wallington I. Clayes
BY
ATTORNEYS Patented Nov. 10, 1931

1,831,094

UNITED STATES PATENT OFFICE

WELLINGTON I. CLAYES, OF SAN FRANCISCO, CALIFORNIA

FILTER

Application filed September 19, 1928. Serial No. 306,856.

This invention relates to filters particularly designed for use in the reclamation of motor lubricating oils.

A vast amount of motor lubricating oil is thrown away each year on the supposition that such oils after having been used for a short period of time have become worn out. Of recent years considerable research has been carried on along this line with the result that the fact has been established that lubricating oils do not wear out, but are merely unfit for further use, due to the foreign matter with which these oils have been contaminated while in use. If therefore, a suitable filter can be constructed for economically filtering these oils, a great saving can be effected.

At least two difficulties have arisen in attempting to reclaim lubricating oils. First, the detrimental foreign matter is suspended in the oil in a very finely divided state, thereby making filtration very difficult, and second, soaps have been formed in these oils which of themselves are not detrimental as far as the lubricating qualities of the oil is concerned, but which are detrimental inasmuch as these soaps tend to clog the filtering medium used. The first problem has been recognized for some time and attempts have been made to overcome it. Although it has been a well known fact to chemists that soaps are formed in lubricating oils, no one as far as the applicant is aware, has attempted to construct a filter which overcomes both objections.

In general it is the object of this invention to provide an economically constructed filter for effectively filtering lubricating oils of the finely divided foreign matter which they hold in suspension and which will not be clogged by the soaps which are present in such oils.

More specifically the object of this invention is the provision of a filter comprising a tier of layers of a pulverulent material, through each layer of which a liquid to be filtered is adapted to be progressively passed, and a chemical having an alkaline reaction associated with one of said layers.

The invention possesses other advantageous features, some of which with the foregoing will be set forth at length in the following description, where I shall outline in full that form of my invention, which I have selected for illustration in the drawings accompanying and forming part of the present specification. In said drawings I have shown one form of my invention, but it is to be understood that I do not limit myself to such form since the invention, as set forth in the claims, may be embodied in a plurality of forms.

Referring to the drawings:

Figure 1 is a vertical mid-section of a filter embodying the objects of my invention.

Figure 2 is a vertical section of the filter shown in Fig. 1, showing its details of construction.

Experiment will show that pulverulent filtering mediums such as for example fuller's earth becomes impervious to the passage of liquid when the depth of such material through which the liquid has to pass is greater than a predetermined depth at any given pressure. The filtering action of such mediums is however proportional to the amount of such material through which the liquid to be filtered is made to pass. It is therefore desirable to maintain the effective depth of the filtering medium as great as possible without rendering it impervious to the passage of the liquid to be filtered. In conformity with these facts I have constructed a filter in which the total effective depth of the filtering medium used has been divided into a plurality of layers, separated from each other by filtering screens. Each layer of the tier so formed is made sufficiently thin to allow the liquid to be filtered, to readily percolate therethrough, the total depth of the tier being so chosen as to effectively filter out substantially all of the undesirable foreign matter held in suspension by the liquid.

To prevent the soaps which are present in the lubricating oils to be filtered, from clogging the filtering medium the lubricating oil may first be made to pass through a layer of fuller's earth or other pulverulent filtering medium, in which has been suspended some chemical having an alkaline reaction, The use of an alkaline reacting substance is not only advantageous in that it dissolves any soaps which may be present in the liquid to be filtered, but it also insures that the filtrate is not acidic. Since the parts lubricated by oil are generally metallic, it can be readily appreciated that it would be disadvantageous to have an acidic lubricant.

In the embodiment of my invention shown in the drawings, the filter per se (such as shown in Fig. 2) is built up as follows: A screen 1 serves as a support for the entire structure. Disposed just above the screen 1 is an animal or other membrane 2 which is preferably encased by a burlap bag 3. The membrane 2 is conveniently made of chamois skin and although the bag 3 in this instance has been made of burlap any other fabricated material may be used if desired. Above the membrane 2 is a plurality of layers of cotton batting 4, the upper surfaces of which have been covered or coated with a pulverulent material 5 such as fuller's earth. Since the cotton batting 4 merely serves as a convenient means for supporting a plurality of layers of fuller's earth or other pulverulent material, it will be seen that the cotton batting may be replaced by a great many other materials, such as for example, muslin, twill or duck. The number of layers of cotton batting and fuller's earth is optional and depends entirely upon the degree of filtration that is desired. The uppermost layer of fuller's earth is covered over by a layer of burlap 6 or any other suitable covering and filtering material.

Above the upper layer of burlap 6 is placed what I have designated as a buffer layer generally designed as 7, which consists of a cloth bag 8 containing a thin layer 9 of fuller's earth. In order to dissolve the soap which may be present in the oil to be filtered, before the oil passes thru the body of the filter, the layer of fuller's earth 9 is preferably treated with an alkaline reacting chemical, such as lime, dry air slaked lime, sodium carbonate or sodium borate. A metallic screen 11 or other suitable reticulated material may be used to completely encase the bag 8.

Since a certain amount of sedimentation usually takes place in lubricating oils to be reclaimed, it is desirable to provide a settling pan 12 above the buffer layer. As is clearly shown in the drawings the pan 12 is of a shallow construction and is provided along its walls with a plurality of apertures 13. As the bottom of this pan is imperforate the only escape for oil falling within this pan is either through the apertures 13 or over the top of its walls. This construction therefore permits sedimentation on the floor of the pan.

The filter as above described may be conveniently supported at the bottom of a cylindrical oil tank 15 as follows: The lower end of the cylinder 15 is flanged as at 16. Co-operating with this flange is a spacing ring 17, the depth of which is dependent on the number of layers of cotton batting and fuller's earth to be used in the filter. A supporting or clamping ring 18 is adapted to co-operate with the spacing ring 17. It is to be noted that the supporting screen 1, the membrane 2 and the burlap 6 extend beyond the layers of cotton batting 4. The extending portions of the supporting screen 1 and the membrane 2 are adapted to be clamped between spacing ring 17 and the clamping ring 18 while the extended portion of the burlap covering 6 is adapted to be clamped between the flange 16 and the spacing ring 17. In order to make an oil tight seal gaskets 19 and 21 of suitable thickness, soaked in water and coated with glycerine have been provided. In the construction shown the flange 16, the spacing ring 17 and the clamping ring 18 have been provided with a plurality of registering apertures adapted to accommodate bolts 22 for clamping these various members together.

Any free spaces which may exist between the peripheries of the layers of cotton batting 4 and the walls of the spacing ring 17, may be filled up with fuller's earth, as shown by the stippling in Fig. 1. This prevents any oil from passing down along the walls of the spacing ring 17, for the fuller's earth so disposed is of such a depth as to be practically impervious to the passage of any oil.

In order to prevent the sediment formed in the bottom of the pan 12 from being disturbed when a further quantity of oil is introduced into the tank 15, a ring 24 may be adjustably suspended above the pan 12, and the oil to be introduced into the tank may be introduced by means of a metallic tube 25, having its discharge end in contact with the ring 24 or adjacent thereto.

Although only a few chemicals have been mentioned for use within the buffer layer for dissolving the soaps which may be present in the liquid to be filtered, it can readily be understood that there are a great many alkaline reacting chemicals which may be used for that purpose. Instead of dissolving the soaps which may be present in the oil to be filtered, it is sometimes advantageous to cause their precipitation. In this event there are salts such as sodium chloride, alum and the magnesium salts which may be used for treating the fuller's earth contained in the buffer layer 7. As here shown and described only the buffer layer has been treated with these chemicals but needless to say any or all of the layers of fuller's earth 5 may be so treated if desired.

In actual practice baking or sedimentation is first allowed to take place in the lubricating oil to be reclaimed. As is well known heat is beneficial to this action. The supernatant clear liquid is then drawn off from the oil so treated and is subjected to the filtering action of a filter constructed as above described. As in the sedimentation process it is desirable to heat the liquid somewhat in order to make it more viscous and thereby permit it to progress through the various layers of the filter more rapidly. Lubricating oil reclaimed in this manner has been found to be equally as good as fresh oil if not better. In fact some persons prefer reclaimed oil to fresh oil.

Although it would not be practical to use a membrane 2 before the oil to be filtered has been subjected to the filtering action of the various layers of fuller's earth, when placed as shown in the drawings it produces an effective last filtering action on the oil and prevents the possibility of any fuller's earth from passing thru the filter.

I claim:

1. In a filter for reclaiming oil containing foreign matter, a filter body comprising a supporting screen, a layer of membrane over the screen, a plurality of layers of fuller's earth, at least one of the upper layers of said fuller's earth being treated with a chemical having an alkaline reaction, a plurality of layers of fibrous material separating said fuller's earth, a sediment pan on top of the filler body, a tank for receiving oil to be reclaimed, and means for mounting the filter at an open end of the tank to form a filtering closure for the tank.

2. In a filter for reclaiming oil containing foreign matter, a sediment pan, a buffer layer of fuller's earth containing a chemical having an alkaline reaction located under the sediment pan to receive first contact with oil passing from the sediment pan, a plurality of layers of fuller's earth below said buffer layer, a plurality of layers of fibrous material separating said layers of fuller's earth, a filtering membrane under the before-mentioned layers, and a supporting screen underlying the entire filter body.

3. In an apparatus for the physical and chemical treatment of used lubricating oil, a plurality of relatively thin layers of a finely divided pulverulent filtering material, each layer of filtering material being separated from each other layer by a fibrous layer of material, the total quantity of said pulverulent filtering material in the apparatus being sufficient to secure a desired clarification of the oil in less time than if the oil were filtered through said pulverulent filtering material in a body instead of the plurality of relatively thin layers, the apparatus including a first layer of material for contact with oil to be filtered initially before the oil passes to the body of the filter, the first layer being treated with an alkaline reacting chemical.

In testimony whereof, I have hereunto set my hand.

WELLINGTON I. CLAYES.

CERTIFICATE OF CORRECTION.

Patent No. 1,831,094.   Granted November 10, 1931, to

WELLINGTON I. CLAYES.

It is hereby certified that error appears in the printed specification of the above numbered patent requiring correction as follows: Page 2, line 126, for the word "baking" read laking; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.